Dec. 26, 1967  M. GRAZIOSI  3,360,623
THREE WIRE GROUND TYPE SAFETY FUSE RECEPTACLE
Filed Feb. 5, 1964  2 Sheets-Sheet 1
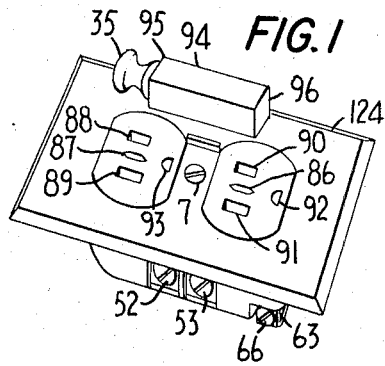
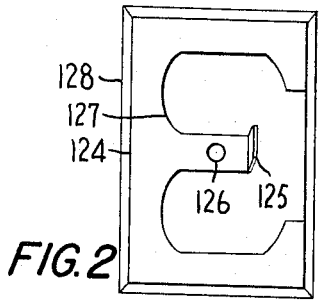
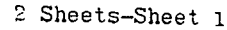
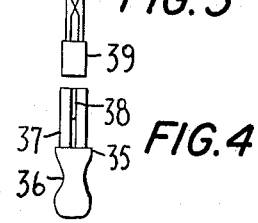
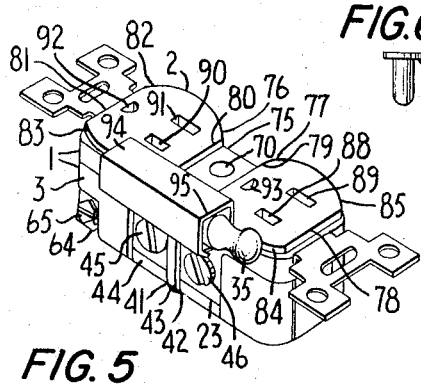
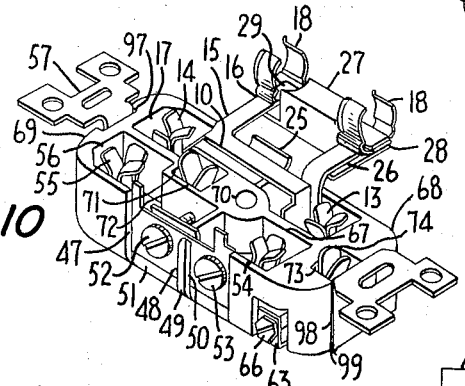
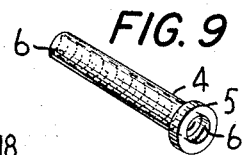
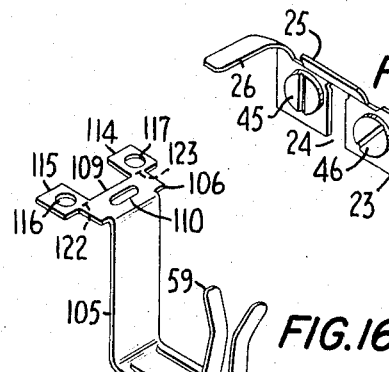
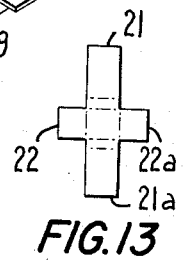
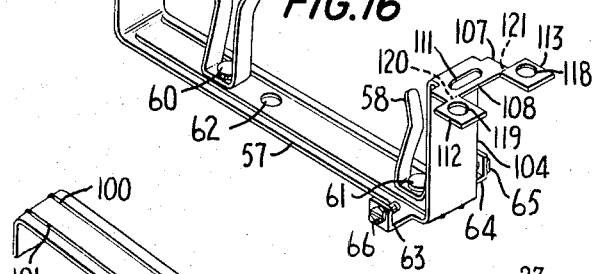
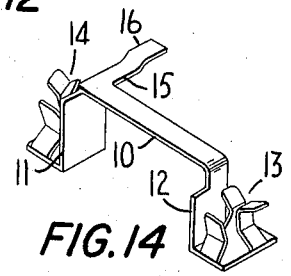
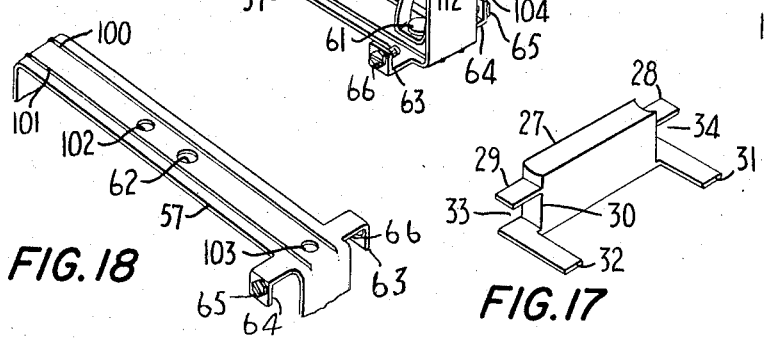
INVENTOR.
MICHAEL GRAZIOSI Dec. 26, 1967    M. GRAZIOSI    3,360,623
THREE WIRE GROUND TYPE SAFETY FUSE RECEPTACLE
Filed Feb. 5, 1964    2 Sheets-Sheet 2
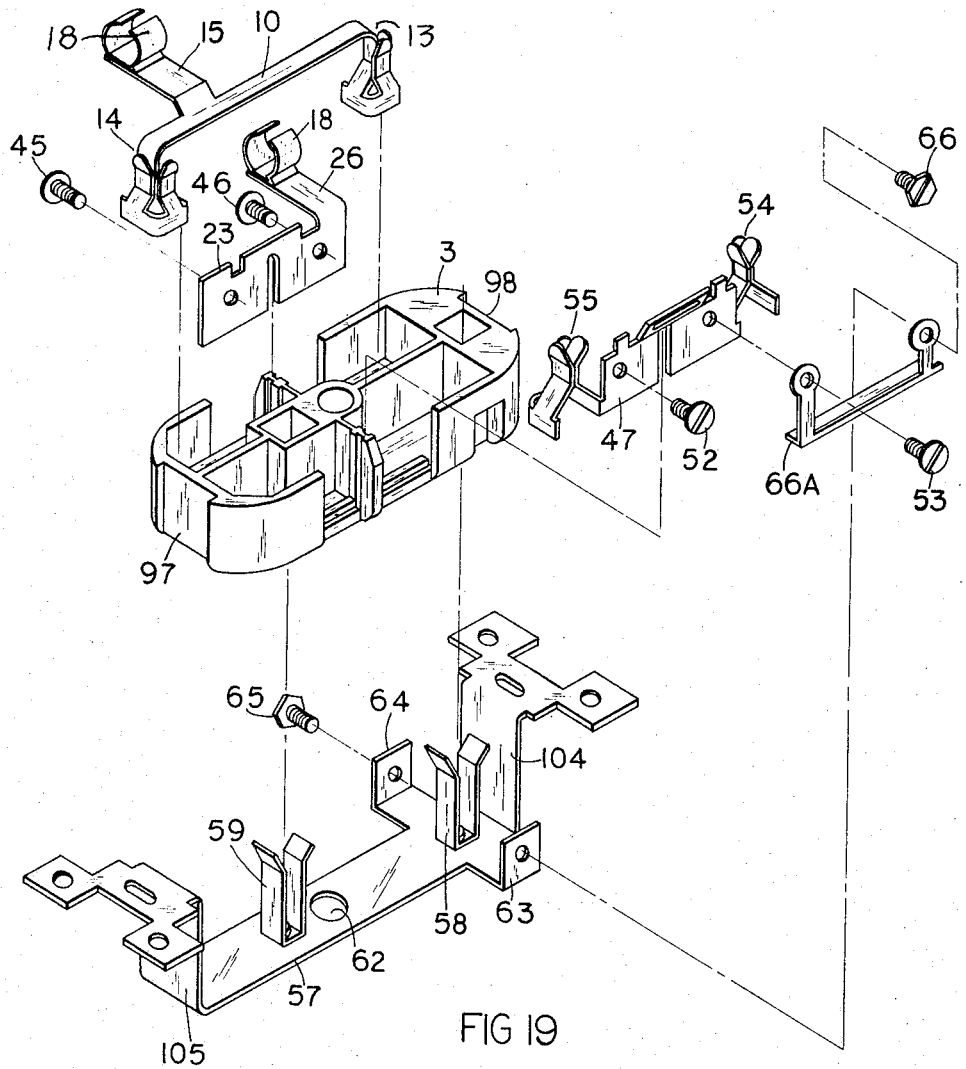
FIG 19
FIG 20
INVENTOR.
MICHAEL GRAZIOSI
BY HIS ATTORNEY
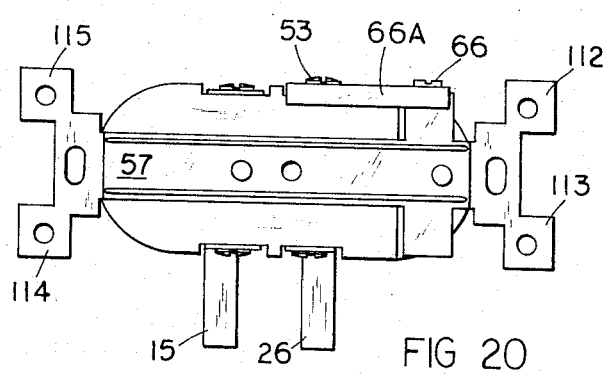

United States Patent Office 3,360,623
Patented Dec. 26, 1967

3,360,623
THREE WIRE GROUND TYPE SAFETY
FUSE RECEPTACLE
Michael Graziosi, 383 2nd St., Jersey City, N.J. 07302
Filed Feb. 5, 1964, Ser. No. 342,736
6 Claims. (Cl. 200—115.5)

The present invention is an improvement of my 3-Wire Safety Fuse Adaptor, Grounding Type, Patent No. 2,988,617. The principle as applied to my adapter patent may be applied to wall receptacles having one or more recepticles. The present invention relates to electrical wall receptacles and more particularly to a new and novel form of a fused electrical connecting device for making a ground connection.

The use of a polarized or grounding type wall receptacle, for added safety, can be used as an ordinary receptacle taking the regular 2-blade caps. Also, many new appliances having a 3-blade cap that are grounded may be used, the fuse acting as a protection to persons, and further rendering fuse protection to appliances thereby eliminating the possibility of burning out of equipment and perhaps homes. Attachment caps commonly employ two parallel and identical blades for insertion into a receptacle, one of the blades is thereby connected to the energized or "hot line" while the other is connected to a wire which ordinarily is grounded. In some specialized applications such as for shipboard use, neither line is grounded, and in no case by this system is it possible to identify with certainly any wire at the appliance itself which will be connected to ground when the appliance is plugged in. When an appliance has any portion of its exterior made out of metal or a conductive material leakage or fault current can flow into this conductive portion, and if touched by a person who is himself grounded as by standing on the ground, such current can cause an undesired shock unless the frame is reliably grounded. Even in the absence of leakage or fault current, such an effect is common when the electrical capacity to the frame is sufficient, and this effect is usually the more pronounced when a better grade of insulation is used. So serious are these dangers, in the case of electrical devices used in damp locations or outdoors, that the numerous resultant fatalities have induced changes in the "National Electric Code" promulgated by Insurance Underwriters' groups and embodied in many codes and ordinances having the effect of law.

Starting June 1963 the National Electric Code required the use of grounding type receptacles only, on all new electrical construction work. Positive grounding of the exterior conductive frame of such devices by means of a third supply wire is thereby required and many manufacturers now frequently provide devices equipped with such a third grounding wire in the supply cable of the device. The supply cable is terminated either in a three-prong connector plug, which cannot be used with most of the receptacles now in existence, or in a common parallel blade plug and extended grounding wire, dangling and unconnected. Neither of these arrangements can provide a convenient means for quickly connecting such an appliace to an ordinary outlet in a safe manner, and it is the purpose of this invention to provide a means for doing so.

Branch circuits in domestic service use for accommodating the type of equipment described are ordinarily of the kind rated at 15 amperes maximum load, but because of the increasing use of electricity in the home are often fused well in excess of this rating, or even provided with "slow-blow" fuses capable of sustaining for a short time, very heavy loads such as are required for starting large motors.

Under these circumstances, safety of portable equipment and tools is prejudiced, even where a third wire ground is used as described above, because short circuit currents can develop a dangerous voltage drop in the long third wire and the connections thereto, which in this case, is necessarily directly communicated to the "Person," under the most effective contact conditions. Even when the circuit is properly fused, it is often the case that the ground wire connection is formed through a "Steel Sheath" on the house wiring cable, and includes numerous mechanical connections of indifferent electrical quality.

For these reasons I find it desirable to provide a connecting device which contains its own "Fuses," of an appropriate rating less than that of the branch circuit fuses, and in this manner the above described difficulties peculiar to the third wire portable electrical devices are entirely overcome. In addition to the advantages above mentioned, it will be apparent by using smaller fuses than the branch circuit fuses in the instant device, they can be induced to blow preferentially, thus protecting the larger fuses from damage. There is thereby avoided the difficult task of locating and replacing blown branch circuit fuses, the interruption of current to other devices operating from the same branch circuit which may include electric clocks which require resetting upon fuse replacement, and the possibility of blowing the more expensive main fuses which occasionally blow in preference to the the branch circuit fuses upon occurrence of a short circuit.

These and other objects of the instant invention I obtain by the employment of a wiring device which comprises an insulated body member containing its own removable fuse cartridge, having one or more female slot blade cap connectors, said body being provided with a third female prong connector socket for a ground connection.

Another object of this invention is to provide an attachment means for portable appliances having grounding connections which are usable with safety on any branch circuit regardless of how heavily such a circuit may be fused.

A further object of the invention is to provide such means wherein a grounding connection is maintained when the appliance is turned off by means of a switch on the appliance which interrupts the normally grounded line.

Still another object is to provide such means wherein an appliance ground is maintained despite the blowing or absence of the fuse in the attachment means.

A major object of the present invention is to provide a "Shockproof and Foolproof" method of opening a power circuit in case of a short circuit in an appliance thereby preventing a person from receiving an electric shock, and also to prevent the burning out of an apliance. Without using the present invention shock protection must rely on the steel sheath of the house wiring cable, and in case one bond is broken in its numerous mechanical connections, or if a ground wire connecting the steel sheath of the house wiring cable to the street side of the water meter pipe is disconnected, there is no protection given to persons coming in contact with an electrically charged metallic frame of an appliance in case of a short circuit.

As stated above in case one BX steel sheath bond is broken in its numerous mechanical connections, or if ground wire connecting the BX steel sheath of the house wiring cable is disconnected from the street side of the water meter pipe, being the ground connection is broken, there is no protection against electrical shocks.

In order to overcome the hazard of an open circuit ground connection, provide a link shunted across a connecting negative feeder wire binding screw and a grounding receptacle binding screw.

If the metallic shell of an appliance becomes charged with an electric current due to a short circuit, the fault current can follow two paths to ground, either through the BX steel sheath of the house wiring cable, or through the negative feeder grounded line wire.

By using the instant invention the shunt, as described above, offers a positive and foolproof shock protection means to persons, as well as fuse protection to appliances due to short circuits.

Another object of the invention relates to a face plate designed for the present invention which will be absolutely safe, and which will safeguard the operator against any danger from electrical shock, should any wiring connections become loosened in wall outlet boxes, or connections therewith.

It is a further object of the invention to provide a face plate that can be used with any of the standard wall outlet boxes employing electric wall receptacles.

Another object of the present invention is to provide a face plate which may be finished in different colors approximately corresponding to wall finishes.

Still another object of the invention is to produce a face plate which can be die-stamped out of sheet metal, or can be molded on plastic molding machines, making it very economical to manufacture.

The invention will be more fully understood from the following description of a specific embodiment thereof taken with the drawing, in which:

FIGURE 1 is a view in perspective of the assembled feature of a duplex receptacle of the instant invention.

FIGURE 2 is a view in perspective of a duplex face plate cover.

FIGURE 3 is a view in perspective of a ceramic cartridge fuse.

FIGURE 4 is a view in perspective of a cartridge fuse holder.

FIGURE 5 is a view in perspective showing one side and top of a feature of a duplex receptacle comprised of a two section hollow body.

FIGURE 6 is a front view of a binding head drive pin.

FIGURE 7 is a front view of a binding head machine screw.

FIGURE 8 is a front view of an oval head machine screw.

FIGURE 9 is a front and top shoulder view of a hollow locking post.

FIGURE 10 is a view in perspective showing the other side and interior portion of FIGURE 5 of features of a duplex receptacle.

FIGURE 11 is a view in perspective showing one of the identical pair of fuse clips having open jaw sides.

FIGURE 12 is a side perspective view showing the formation of an oblong clip opening, same are clipped on to positive and negative conductor plates.

FIGURE 13 is a view in perspective showing a cross shape pattern from which the fuse clips are constructed.

FIGURE 14 is a view in perspective of a part of the positive conductive portions of FIGURE 10.

FIGURE 15 is a view in perspective of another part of the positive conductor portion of FIGURE 10.

FIGURE 16 is an inside view in perspective of an extended metallic band which secures the two sections of hollow body together, the pin sockets shown offering a grounding connection means for a third wire.

FIGURE 17 is a view in perspective showing an insulated fuse clip holder to which are retained a pair of fuse clips.

FIGURE 18 is a bottom face view in perspective showing a pair of longitudinal indentations which reinforce metallic band.

FIGURE 19 is an exploded view of the inner receptacle arrangement, omitting the fuse clip holder.

FIGURE 20 is a bottom view of the receptacle arrangement.

Referring now more particularly to the drawing in which similar reference characters denote like parts throughout, it will be noted that I provide features of a duplex receptacle comprised of a two section hollow body 1 employing an upper body member 2 and a lower body member 3. The members 2 and 3 are secured together by means of a hollow locking post 4 having a flange 5 on its upper end, and being internally threaded at both ends 6. The upper end may receive a face plate screw 7 and the lower end may receive a binding locking machine screw 8. The face plate and locking machine screws secure upper 2 and lower 3 body members together. A binding head drive pin 9 (FIGURE 6) may be substituted for locking screw 8 at the lower end of the locking post 4 and constitutes a simple and efficient means for holding the assembly together.

The two piece hollow body 1 is preferably constructed out of an insulating material such as a phenolic plastic material and because of its shape, which contains no undercuts or blind cavities, may be molded conveniently and at a high rate of speed on plastic molding machines. A longitudinal cross-bar element 10 comprises two vertical integral projection arms 11 and 12 which extend downwardly from cross-bar 10, the two ends thereof being convoluted so as to form adequate spring loaded female prong connector socket portions 13 and 14. A substantially right angle shelf 15 extends transversely from the bar 10 and is integral with said cross-bar 10. The right angle shelf 15 is provided with an offset 16, and the two spring loaded female prong connector socket portions 13 and 14 are retained in the bottom of a longitudinal chamber 17 of the body 1.

Fuse clips 18, 18 are identically formed and are constructed out of sheet metal such as spring copper or brass. Cross shape patterns 21 and 21a (FIGURE 13) form the long arms which are curved inwardly and comprise the upper portion of fuse clips 18, 18 and are for the retaining of fuse 39a. As shown in FIGURE 11 the reference numeral 19 shows the open front face of fuse clip jaws for resilient engagement of fuse 39a. The short arms 22 and 22a are curved downwardly, the ends meeting each other forming an oblong clip opening 20 (see FIGURE 12), and 20a is shown as a side view of oblong clip opening 20 which comprises the bottoms of fuse clips 18, 18. One side of lower body member 3 is provided with a positive contact plate 23 having a vertical slot 24 almost to its top portion where a small rectangular section 25 is bent outwardly on a 45-degree angle. One end of plate 23 extends outwardly forming a shelf 26. The bottom portion of one fuse clip 18 is constructed by having its ends folded downwardly and inwardly forming an oblong opening 20 and is clipped over extension shelf 26. An insulated fuse clip holder 27 is formed having a concave upper portion with flat strip extensions 28 and 29 on each end to which are secured the lower oblong fuse clip openings 20 and 20a.

The open jaw faces 19 of fuse clips 18, 18 are in alignment with the concave portion of an insulated fuse clip holder 27. A longitudinal partition 30 having flat strip extension ends with a short arm 31 and a long arm 32 are formed substantially at right angles, and extend transversely inwardly of the longitudinal partition 30. Spaces 33 and 34 are provided on each end of insulated fuse clip holder 27, in said spaces are positioned the oblong lower portions of fuse clip openings 20 and 20a, flat strip extensions 28 and 29 on upper face, while the short arm 31 and long arm 32 on lower face act as a support and an insulation medium against grounding to positive conductors. The fuse clip holder 27 must be constructed of an insulating material such as phenolic and because of its shape, which contains no undercuts or blind cavities, may be molded conveniently at a high rate of speed on plastic molding machines.

The fuse clips 18, 18 may be retained either slidably or can be molded as inserts onto the insulated fuse clip holder 27. A cartridge fuse holder 35 has a molded plastic centrally located flared groove 36 to which is molded a metallic tube 37 having a split 38 therethrough for resiliently gripping a cartridge fuse 39a when inserting or extracting said cartridge fuse 39a from fuse clips 18, 18. Reference numerals 39 and 40 represent the metallic fust contact ends of the cartridge fuse 39a. Positive conductor plate 23 having a vertical slot 24 through its midsection is slidably retained in grooves 41 and 42, FIG. 5, and are formed on each side of a vertical upright 43 provided on the midsection of a square opening 44 situated on one side of lower body member 3.

Positive conductor plate 23 may be provided with two screw threaded holes, into which are adapted two binding screws 45 and 46 for retaining conductor feeder wires. Longitudinal cross-bar element 10, vertical integral projections 11 and 12, spring loaded prong connector sockets 13 and 14, right angle shelf 26, and positive conductor plate 23 are all constructed by metal die stamping machines. The opposite side of lower member 3 of split hollow body 1 is provided with a negative conductor plate 47 which is formed partially as the positive conductor plate 23 with the exception of it not having extension shelf 26 shown on FIG. 15. The lower right and left sides of negative conductor plate 47 FIG. 10 project inwardly and are integral with lower right and left sides of female prong connector socket portions 54 and 55. Negative conductor plate 47 is slidably retained in grooves 48 and 50 formed on each side of vertical upright 49 provided on the mid-section of a square opening 51 situated on one side of lower body member 3.

The negative conductor plate 47 having two screw threaded holes is adapted to receive two screws 52 and 53 for retaining negative feeder wires. The negative conductor plate 47 is of conductive material and convoluted to form adequate spring loaded female prong connector socket portions 54 and 55 on both ends thereof which are retained in a longitudinal extending chamber 56 in lower body member 3. Referring to FIG. 18 it will be noted that the bottom face of an extended metallic band 57 is provided and has an aperture 102 which is a little off center, and another aperture 103 on one end. Into the apertures 102 and 103 are fixed grounding pin sockets 58 and 59 which are held in an upright fixed position by rivets 60 and 61. On the center of extended metallic band 57 there is provided an aperture 62 into which is inserted either a binding locking machine screw 8 or a binding drive pin 9 for connection into the lower end of the hollow locking post 4. On one end of the extended metallic band 57 is provided a pair of projections 63 and 64 which extend outwardly and upwardly and have a pair of threaded holes at their ends adapted to receive a pair of binding screws 65 and 66 for connecting grounding wires. The National Electric Code requirement is that these screws 65 and 66 must be of a green color so as to identify them as being used for grounding purposes. A shunt link connection 66A is provided and may be connected between the binding screw 66 and the screw 53 as shown in FIGURE 20.

End wall recesses 97 and 98, as shown in FIG. 10, are provided on the upper body member 2 and lower body member 3, these recesses may be in alignment to provide continuous channels in the end portions of the assembled bodies 2 and 3. A longitudinal bottom face recess 99 in the lower body 3 may be provided to retain the extended metallic band 57. On each side of bottom face of the extended metallic band 57 are formed a pair of longitudinal indentations 100 and 101 which are to reinforce the bottom face of the extended metalic band 57. Bottom face ends 104 and 105 of the longitudinal extended metallic band 57 are bent upwardly and outwardly, the outwardly bent portions 106 and 107 are a little wider than the other portions of the extended metallic band 57 which thereby form the tabs 108 and 109 which oppose each other and extend beyond the ends of the receptacle.

In the central end portions of tabs 108 and 109 are provided oblong openings 110 and 111 through which are inserted screws which are received and secured into threaded holes formed on a pair of outwardly projecting ends or ears of an outlet wall box (not shown). On each side of oblong openings 110 and 111 are provided a pair of plaster ears 112, 113, 114 and 115 having holes 116, 117, 118 and 119 thereon, the plaster ears must be provided on the extended metallic band 57 due to a requirement of the Nation Electric Code. If said plaster ears are not needed they can be broken off at indentations 120, 121, 122 and 123.

Between the longitudinal extending chambers 17 and 56 in the lower body member 3, is provided an upwardly extending irregular wall 67, FIG. 10, formed in the longitudinal central portion of the lower body member 3 which connects end walls 68 and 69 and thereby divides chambers 17 from 56. In the upwardly extending irregular wall 67 an aperture 70 is provided in the central portion thereof running straight through from top to bottom through which is inserted the hollow locking post 4 for securing and locking the upper 2 and lower 3 body members together. Also, the upwardly extending irregular wall 67 is provided with two rectangular spaced openings 71 and 73 through which protrude a pair of grounding pin sockets 72 and 74. The inside of the upper body member 2, comprising the cover section, is so formed that its cutouts for accommodating the conductor elements are aligned with cutouts in lower body section 3.

On the top of surface 75 (FIG. 5) of the upper body member 2 are a pair of slightly upwardly extending receptacle elements 76 and 77 having outer and inner fringe portions 78, 79, 80, 81 formed straight, and outer side face fringe ends 82, 83, 84, 85 formed rounded. The inner area of receptacle element is provided with partitions 86 and 87, FIG. 1 which space two pairs of female slots 88, 89, 90 and 91. On the center of one inner straight side of receptacle 77, and one outer straight side 81 of receptacle 76, FIG. 5, U-shaped openings 92 and 93 are provided. The area around female slots 88, 89, 90 and 91 and U-shaped openings 92 and 93 are concave so as to ease the connecting of male plug cap prongs. On one side wall integral with top surface 75 is provided an upwardly extending rectangular hollow casing 94 for the cartridge fuse 39a accommodation. A fuse-aligned fuse insertion or removal access opening 95 is provided on one end face, the top face is formed rounded, the other end face 96 is formed blind, the bottom face is open.

A cartridge fuse holder comprising an insulated knob 35 having a flared groove 36 for finger grasp, is situated on one end and has embedded therein a split cylindrical metal insert 37. Insertion of either of the metallic cartridge fuse ends 39 or 40 into split cylindrical metal insert 37 causes it to expand thereby gripping and holding tightly under the pressure cartridge fuse 39a in a locked position. In this manner when the cartridge fuse 39a is inserted into split cylindrical insert 37 it causes an expansion, and upon extraction it causes a contraction.

FIGURE 2, a duplex face plate cover 124 which is made from sheet metal, having a slightly upright face plate cover brace 125 situated centrally between receptacles 76 and 77 which are illustrated in FIG. 5. At 126 is shown an aperture through which is inserted face plate screw 7, FIG. 8 which is received into the center of flange 5 of the threaded upper end 6 of the hollow locking post 4, its object is to secure and lock metal duplex face plate cover 124 onto the insulated two-section hollow body 1, and 127 is a machine die stamped cutout through which protrudes rectangular hollow casing 94 and duplex receptacles 76 and 77, FIG. 5. These are formed integral with upper body member 2, and at 128 are shown the bevel edges on the fringe of duplex face plate cover 125.

This is a reinforcement means so as to prevent duplex face plate cover 124 from being warped from original level shape.

In FIG. 1 are shown female slots 89 and 91 formed a little larger in width than slots 88 and 90, the purpose is, prongs of a two wire plug cap can only be inserted in one way into a receptacle. The wider female slots 89 and 91 are the negative conductors, and the narrow female slots are the positive conductors which are shown as 88 and 90. This is what is termed as a polarized system, a requirement of the National Electric Code where all negative and positive wiring in a system connects positive to positive and negative to negative.

It is to be understood that a fuse replacement or ejection can be brought about without taking anything apart on the instant invention. A fuse replacement or ejection is brought about by simply pulling out fuse holder 35 which lies on top of face plate cover 124, this simplifies and speeds up the insertion or extraction of fuse replacements.

The invention herein disclosed and illustrated is shown as a pattern of a duplex receptacle which is most popular in its category, but it is to be understood more specifically that a new and advantageous form of a fused electrical connecting device adapted for making a ground connection can be constructed having one or more plug-in-receptacles.

While a preferred embodiment of my invention has been described and illustrated, it is to be understood that modifications as to form, arrangement of parts and use of materials may be made without departing from the spirit and scope of the invention as claimed.

I claim as my invention:

1. A fused wall receptacle comprising a hollow compartmented body, said hollow compartmented body having an upper body member connectable to a lower body member, said lower body member having a bottom wall face, a metallic band means connectable to said bottom wall face and adapted to extend upwardly on the ends of the compartmented body, a pair of ground pin sockets connected to said metallic band means and extending into the compartmented body through said lower body member, a cross-bar element disposed within the lower body member being provided with prong connector sockets, a positive connector plate having a means for retaining a positive conductor element disposed within said hollow compartmented body, a negative conductor plate connectable to the compartmented body and having a pair of prong connector sockets disposed within the body, said upper body being provided with a pair of upwardly extending receptacle elements, each of said receptacle elements having a pair of slots in alignment with said positive and negative conductor elements and a U-shaped opening in alignment with said ground pin socket, a rectangular hollow casing connected to said upper body member adapted to receive a fuse, said cross-bar member having a right angle shelf with a fuse clip connected thereto, an extension shelf integral with said positive connector plate and being provided with a fuse clip for cooperating with the fuse clip on said right angle shelf to retain a fuse therebetween, a locking post member connectable between the upper body member and the lower body member for securing the members together, and a face plate cover disposed over said upper body member for enclosing said hollow compartmented body portion.

2. The fused wall receptacle according to claim 1 wherein an insulated fuse clip holder is connected between said fuse clips and having flat strip extensions connected to said fuse clips, said fuse clip holder being provided with a longitudinal partition having a short flat strip arm and a long flat strip arm extending transversely thereof, said flat strip extensions and arms being comprised of insulating material.

3. The fused receptacle according to claim 1 wherein said fuse clips are connected to said right angle shelf and said extension shelf, the means of connecting said fuse clips comprises a metal cross-shaped member being provided with four arms, two long arms being oppositely disposed are curved inwardly to form jaws for fuse retention, and two oppositely disposed short arms being bendable downwardly and inwardly toward each other to form oblong openings slidably engageable with said right angle shelf and said extension shelf.

4. The fused wall receptacle according to claim 3 wherein said positive conductor plate comprises a flat metal plate having a vertical slot cut therein, said flat metal plate having a top end being bent outwardly at an angle of 45 degrees, a flat metal strip extending outwardly from the top end of said flat metal plate forming said extension shelf, said extension shelf being insertable in the oblong opening of said cross-shaped member, said flat metal plate having threaded holes therein for receiving a positive conductor wire to be held thereagainst by a screw.

5. The fused wall receptacle according to claim 4 wherein said cross-bar member comprises a longitudinal cross-bar having two downwardly extending arms, each arm having an end portion convoluted to form a spring loaded female prong connector socket, a right angle shelf extending transversely of said cross-bar and being integral with said cross-bar, said right angle shelf being provided with an offset, said right angle shelf being insertable in the oblong opening of said cross shaped member.

6. The fused wall receptacle according to claim 5 wherein said negative conductor plate comprises a flat metal plate having a vertical slot therein, said metal plate having a top end a portion of which is bent outwardly at an angle of 45 degrees, said flat metal plate having a pair of threaded holes therein adapted to receive a screw for holding a negative conductor in place, said flat metal plate having a bottom portion and end portions, said end portions being bent inwardly and forming at their ends spring loaded female prong connector sockets.

References Cited
UNITED STATES PATENTS

| | | | |
|---|---|---|---|
| 2,437,802 | 3/1948 | Adler | 200—115.5 |
| 2,515,870 | 7/1950 | Hamilton | 339—122 |
| 2,740,017 | 3/1956 | Luce et al. | 200—133 |
| 3,032,736 | 5/1962 | Howells | 339—14 |

FOREIGN PATENTS

| | | |
|---|---|---|
| 552,163 | 1/1958 | Canada. |

BERNARD A. GILHEANY, *Primary Examiner.*

H. A. LEWITTER, *Assistant Examiner.*